United States Patent [19]
Nakajima et al.

[11] Patent Number: 4,830,908
[45] Date of Patent: May 16, 1989

[54] VEHICLE OUTER PANEL STRUCTURE AND METHOD OF PRODUCING SAME

[75] Inventors: Masao Nakajima, Yokosuka; Takeo Kobayashi, Yokohama; Shigeki Yonehara, Takaoka, all of Japan

[73] Assignees: Nissan Motor Co., Ltd., Yokohama; Nippon Zeon Co., Ltd., Tokyo, both of Japan

[21] Appl. No.: 188,989

[22] Filed: May 2, 1988

[30] Foreign Application Priority Data

May 1, 1987 [JP] Japan ................ 62-106432

[51] Int. Cl.4 ............................... B32B 3/26
[52] U.S. Cl. ..................... 428/246; 156/79; 428/159; 428/247; 428/286; 428/309.9; 428/319.1
[58] Field of Search ............. 156/79; 428/159, 246, 428/247, 286, 309.9, 319.1

[56] References Cited

U.S. PATENT DOCUMENTS 4,741,945  5/1988  Brant et al. .............. 428/286
4,769,278  9/1988  Kamimura et al. ............ 428/159

FOREIGN PATENT DOCUMENTS 55-101659  7/1980  Japan .
62-33632   2/1987  Japan .

Primary Examiner—William J. Van Balen
Attorney, Agent, or Firm—Foley & Lardner, Schwartz, Jeffery, Schwaab, Mack, Blumenthal & Evans

[57] ABSTRACT

A vehicle outer panel structure which is excellent in heat-insulation and reinforcement effects and is facilitated in production. The vehicle outer panel structure is produced by first laminating first, second and third layers to form a laminated sheet. The first layer is formed of a resin composition capable of foaming and including vinyl chloride resin, plasticizer, foaming agent, epoxy resin, hardener for the epoxy resin. The content of the epoxy resin is within a range of from 20 to 500 parts by weight relative to 100 parts by weight of the vinyl chloride resin. The second layer is formed of fiber cloth. The third layer is formed of metallic film having a thickness not more than 50μ. The first, second and third layers are stuck with each other so that the second layer is interposed between the first and third layers. Subsequently, the thus formed laminated sheet is stuck to the back side of a vehicle outer panel, and thereafter heated so that the resin composition of the laminated sheet is foamed and hardened.

25 Claims, 3 Drawing Sheets

FIG. 2 *(PRIOR ART)*
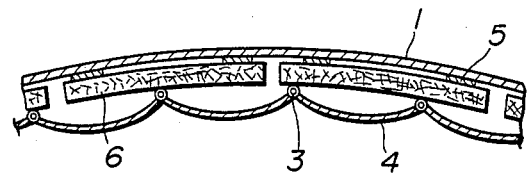
FIG. 3 *(PRIOR ART)*
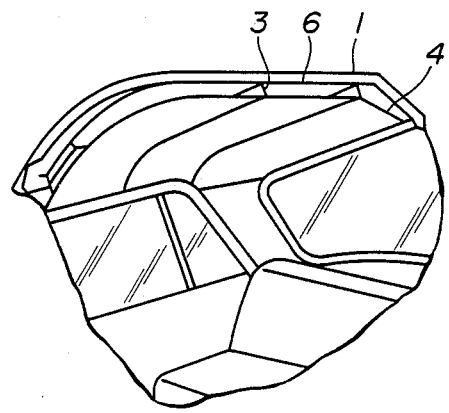
FIG. 4 *(PRIOR ART)*
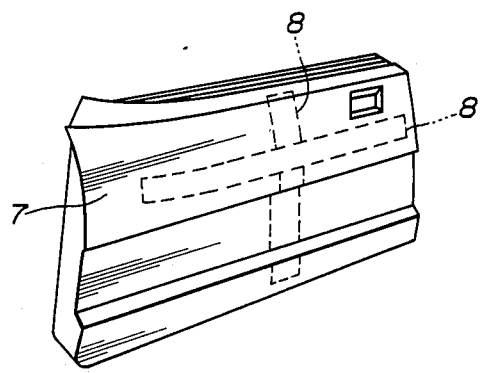

VEHICLE OUTER PANEL STRUCTURE AND METHOD OF PRODUCING SAME

BACKGROUND OF THE INVENTION

1. Field of the Invention

This invention relates in general to a vehicle outer panel structure and a method of producing the same, and more particularly to such a method of producing the vehicle outer panel structure which is excellent in heat-insulation characteristics and reinforcement characteristics for a vehicle outer panel.

2. Description of the Prior Art

Recently, a vehicle outer panel has been eagerly desired to obtain comfort in a vehicle passenger compartment upon improving heat-insulation and to obtain high rigidity upon being reinforced.

First, the meaning of heat-insulation will be discussed. Generally considerable heat flows into the vehicle passenger compartment and flows out to the outside of the passenger compartment through doors, fenders, floor, roof, dash board panel and the like. As a result, in order to suppress the inflow or outflow of the heat, a variety of heat-insulation material such as felt or glass mat is attached to the back side of a vehicle outer panel. For example, a roof panel tends to receive sun light and therefore is subjected to a high temperature of 80° to 100° F. in summer, so that much heat flows into the vehicle compartment through the roof panel. For the purpose of preventing this heat inflow, a heat-insulation structure such as shown in FIGS. 2 and 3 has been employed. The heat-insulation structure in FIGS. 2 and 3 includes a vehicle outer panel structure having a heat-insulation material 6 adhered to an adhesive double coated tape 5 which is adhered to the back side of a vehicle outer panel 1. In this example, listing wires 3 are extended below the vehicle outer panel structure. Additionally, a head lining 4 is supported in a pending manner by the listing wires 3. The heat-insulation material 6 is formed of felt of natural or synthetic fiber or glass mat. In addition, a similar heat-insulation material is attached to the back side of a floor panel, a dash board panel and the like. Thus, heat-insulation of the vehicle passenger compartment is accomplished by means of heat-insulation materials discussed above.

Next, necessity of high rigidity of the vehicle outer panel will be discussed hereinafter. Weight-lightening of automotive vehicles has been promoted from the viewpoints of saving resources and energy. This weight-lightening is accomplished by reducing the thickness of a vehicle outer panel or decreasing the number of structural members. However, this unavoidably lowers the strength of various component parts and causes shortage of surface extension rigidity of outer panel, thereby deteriorating rigidity feeling, particularly in the case of an automotive vehicle door. In order to solve these problems, it has been proposed to use a reinforcement material for reinforcing a vehicle door panel as disclosed in Japanese Utility Model Provisional Publication No. 55-101659. Such a structure is shown in FIG. 4 in which a reinforcement material 8 formed of thermosetting plastic is attached to the back side of a door panel 7.

However, the following difficulties have encountered in the above-discussed heat-insulation material and the reinforcement material. First, heat-insulation material is previously fabricated in a desired shape and is attached to the outer panel, in which the heat-insulation material is generally large-sized and therefore is troublesome to attach. Second, the reinforcement material is a fabricated member formed of the thermosetting plastic containing glass fiber and cross-shaped. However, this reinforcement material is insufficient in heat-insulation.

SUMMARY OF THE INVENTION

It is an object of the present invention to provide an improved vehicle outer panel structure which solves the problems encountered in conventional vehicle outer panel structures.

Another object of the present invention is to provide an improved vehicle outer panel structure which is excellent in heat-insulation and reinforcement effects while facilitating attaching operation thereof.

Therefore, according to the first aspect of the present invention, the vehicle outer panel structure comprises a laminated sheet attached to a vehicle outer panel. The laminated sheet includes a first layer formed of a foamed resin composition containing vinyl chloride resin and epoxy, a second layer formed of fiber cloth, and a third layer formed of metallic film having a thickness not more than $50\mu$. The first layer is stuck onto the back side of the vehicle outer panel. The first, second and third layers are stuck to each other in such a manner that the second layer is interposed between the first and third layers.

According to the second aspect of the present invention, a method of producing the vehicle outer panel structure comprises the first step of laminating first, second and third layers to form a laminated sheet. The first layer is formed of a resin composition capable of foaming and including vinyl chloride resin, plasticizer, foaming agent, epoxy resin, hardener for the epoxy resin, in which the content of the epoxy resin is within a range of from 20 to 500 parts by weight relative to 100 parts by weight of the vinyl chloride resin. The second layer is formed of fiber cloth. The third layer is formed of metallic film having a thickness not more than $50\mu$. The first, second and third layers are stuck to each other in such a manner that the second layer is interposed between the first and third layers. The first step is followed by the second step of sticking the first layer to the back side of a vehicle outer panel to attach the laminated sheet to said vehicle outer panel. The second step is followed by the third step of heating the laminated sheet to foam and harden the resin composition of the laminated sheet.

The thus produced vehicle outer panel structure is excellent in heat-insulation, reinforcement effects and operation efficiency. The vehicle outer panel structure is comprised of the laminated sheet having one side formed of the thin resin composition capable of foaming and having self-adherance due to the epoxy resin and another side of the sheet being formed of the metallic film. Accordingly, the laminated sheet can be readily attached to the vehicle outer panel without using any adhesive in a vehicle assembly procsss, thereby reducing man power and the number and/or effort of workers. Additionally, the laminated sheet forming part of the vehicle outer panel structure is provided with both the functions of heat-insulation material and reinforcement material, thereby contributing to saving resources and energy.

BRIEF DESCRIPTION OF THE DRAWINGS

FIG. 2 is a fragmentary vertical sectional view of a conventional roof structure;

FIG. 3 is a fragmentary perspective view illustrating a conventional heat-insulation structure of an automotive vehicle;

FIG. 4 is a perspective view of a conventional door structure of an automotive vehicle.

DETAILED DESCRIPTION OF THE INVENTION

Figure 1A:
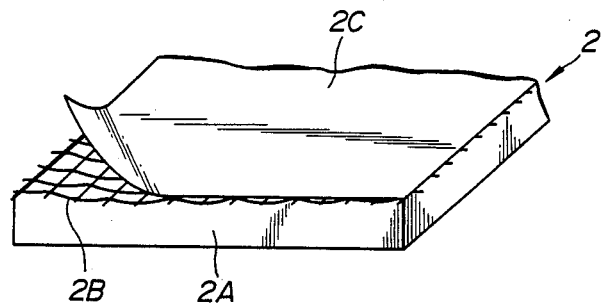
FIG. 1A is a fragmentary perspective view of a laminated sheet forming part of a vehicle outer panel structure in accordance with the present invention.

A first aspect of the present invention resides in a vehicle outer panel structure comprising a vehicle outer panel, and a laminated sheet attached to the vehicle outer panel. The laminated sheet includes a first layer formed of a foamed resin composition including vinyl chloride resin and epoxy resin, a second layer formed of fiber cloth, and a tiird layer formed of metallic film having a thickness not more than 50μ. The first layer is stuck onto the back side of the vehicle outer, panel. The first, second and third layers are stuck to each other in such a manner that the second layer is interposed between the first and third layers.

A second aspect of the present invention resides in a method for producing a vehicle outer panel structure, comprising the first step of laminating first, second and third layers to form a laminated sheet, the first layer being formed of a resin composition capable of foaming and including vinyl chloride resin, plasticizer, foaming agent, epoxy resin, hardner for the epoxy resin, the content of the epoxy resin being within a range of from 20 to 500 parts by weight relative to 100 parts by weight of the vinyl chloride resion, the second layer being formed of fiber cloth, and a third layer being formed of metallic film having a thickness not higher than 50μ, the first, second and third layers being stuck to each other in such a manner that the second layer is interposed between the first and third layers; the second step of sticking the laminated sheet first layer on back side of a vehicle outer panel; and the third step of heating the laminated sheet to foam and harden the resin composition of the laminated sheet.

The resin composition capable of foaming comprises vinyl chloride resin, plasticizer, foaming agent, epoxy resin, and hardener for the epoxy resin. The resin composition optionally further comprises foaming control agent, filler, pigment, heat stabilizer, viscosity control agent. The resin composition is presiously fabricated into a sheet form at a temperature below a level at which the foaming agent thermally decomposes. The resin composition foams at a temperature ranging from 120° to 200° C. and hardens under cross linking of epoxy resin in a heating step.

Examples of the vinyl chloride resin of the present invention are vinyl chloride homopolymer, and copolymer of vinyl chloride and vinyl acetate, acrylic acid, methacrylic acid, acrylic ester, methacrylic ester, maleic acid, fumaric acid, maleic acid ester, fumaric acid ester, itaconic acid, vinylidene chloride, vinyl ether, or the like. The copolymers may be used singly or in combination as the vinyl chloride resin. Otherwise, the single or combined copolymers may be used in combination with vinyl chloride homopolymer as the vinyl chloride resin. Vinyl chloride polymer (including copolymer) to be used as the vinyl chloride resin are prepared by any production methods such as emulsion polymerization or suspension polymerization. It is preferable to use the vinyl chloride resin prepared for paste by emulsion polymerization or micro suspension polymerization, singly or in combination with one prepared by suspension polymerization from the view points of facilitating forming it into the sheet and obtaining suitable foam structure.

Examples of the plasticizer for the vinyl chloride resin are phthalate acid ester such a dioctyl phthalate and dibutyl phthalete: phosphoric ester such as tricresyl phosphate, ester of fatty acid such as dioctyl adipate, dioctyl sebacate: polyester such as condensation product, for example, beween adipic acid and ethylene glycol: trimellic acid ester such as trioctyl trimellitate: chlorinated paraffin: alkylbenzene and high molecular weight aromatic compound. Such plasticizers may be used as singly or in combination as the plasticizer for the vinyl chloride resin. The blended amount or content of the plasticizer is preferably within a range of from 10 to 150 parts by weight relative to 100 parts by weight of the vinyl chloride resin This is because the expansion ratio (discussed below in detail) of the foamed vinyl chloride resin is not improved in case of the content below 10 parts by weight, whereas the hardness of the foamed vinyl chloride resin is not raised thereby to minimize the reinforcement effect of the resultant vehicle outer panel structure in case of the content exceeding 150 parts by weight.

As the foaming agent, organic or inorganic foaming agent, microcapsule of the high temperature expandable type is used. Examples of the organic forming agent are azodicarbonamide, paratoluene sulfonyl hydrazide, dinitroso pentamethylene tetramine, 4,4'-oxybisbenzene sulfonyl hydrazide, and the like. The decomposition temperature of the organic foaming agent can be suitably adjustable with urea, zinc compound, lead compound, or the like. Examples of inorganic foaming agent are sodium hydrogencarbonate, sodium boron hydride, and the like. The high temperature expandable type microcapsule is, for example, one which is obtained by forming low boiling point hydrocarbon into the microcapsule with polyvinylidene chloride. Of these foaming agents, the organic foaming agents having a decomposition temperature not lower than 100° C. are preferable from the view points of facilitating sheet-formation, improving appearance of a foamed member, and obtaining uniformity and fine structure of foam of the foamed body. If the decomposition temperature is lower than 100° C., foaming will be unavoidably initiated when the resin composition capable of foaming is fabricated into the sheet, and additionally gas will escape under insufficient melting of the resin composition during foaming in a heating furnace. Thus, the expansion ratio of the foamed body or foamed resin composition is not raised, such that uniform foamed member cannot be obtained. It will be understood that although the inorganic foaming agent and the microcapsule can be used, they are slightly disadvantageous from the standpoints of improving expansion ratio and economy. The blended amount or content of the foaming agent is preferably 0.5 to 15 parts by weight relative to 100 parts by weight of the vinyl chloride resin. This is because foaming is insufficient in the case of the content less than 0.5 part by weight, whereas foaming degree cannot be improved even in case of the content exceeding 15 parts by weight in which an excessive content is not economical.

Examples of the epoxy resin of the present invention are usual epoxy resins of glycidyl ether type, glycidyl ester type, glycidyl amine type, linear aliphatic epoxide type, and aliphatic epoxide type. The epoxy resins of such various types may be used singly or in combination in accordance with the physical properties of a desired foamed body. The blended amount or content of the epoxy resin is preferably within a range of from 20 to 500 parts by weight relative to 100 parts by weight of the vinyl chloride resin. In this connection, if the blended amount is less than 20 parts by weight, a hard foamed body cannot be obtained; whereas if the blended amount exceeds 500 parts by weight, heat generation during hardening reaction is considerable thereby causing decomposition of vinyl chloride while suppressing expansion of the foamed body, thus making it difficult to obtain the foamed body of a high expansion ratio.

As the hardener for the epoxy resin, usual hardeners of the hot active type wherein hardening action is exhibited under heating are used. It is preferable to use the hardners by which the peak temperature of heat generation is within a range of from 100° to 200° C. in cooperation with the epoxy resin. Examples of the hardener are dicyandiamide, 4,4'-diaminodiphenyl sulfone, imidazole derivative such as 2-n-heptadecyl imidazole, isophthalicacid dihydrazide, N,N-dialkyl urea derivative, N,N-dialkyl thiourea derivative, acid anhydride such as tetrahydrophthalic anhydride, isophorone diamine, methaphenylene diamine, N-aminoethyl piperazine, boron trifluoride complex compound, trisdimethyl amino methyl phenol, and the like. Such hardeners are used singly or in combination as occasion demands. The blended amount or content of the hardener is preferably within a range of from 1 to 20 parts by weight relative to 100 parts by weight of the epoxy resin. If the content is less than 1 part by weight, the foamed body is insufficient in rigidity; whereas even if the content is more than 20 parts by weight, the rigidity of the foamed body does not increase in which blending of an excessive amount is disadvantageous in economy. In this connection, the epoxy resin hardens at a hardening temperature which is a temperature of a medium at a time when heat generation due to hardening reaches the peak during heating of a mixture (prepared at room temperature) of the epoxy resin and the hardener by means of an oil bath or a heater. Suitable combinations and amounts of the epoxy resin and the hardener in accordance with heating conditions can be readily decided by previous tests.

In addition to above-mentioned components, for example, filler such as calcium carbonate, talc, clay and/or the like, heat stabilizer, foaming control agent, colouring agent and/or the like are blended into the resin composition forming the first layer of the laminated sheet. The blended amounts or contents of the filler foaming are preferably within the range of 0 to 200 parts by weight respectively, relative to 100 parts by weight of the vinyl chloride resin. The blended amounts of both the heat stabilizer and the foaming control agent are preferably within the range of 0 to 10 parts relative to 100 parts by weight of the vinyl chloride resin. In this connection, if the blended amount of the filler exceeds 200 parts by weight, fine foam structure of the foamed body cannot be obtained while suppressing the expansion ratio of the foamed body at a lower value. Even if the blended amount of the heat stabilizer and the foaming control agent is more than 10 parts by weight, the effect cannot be improved.

Thus, the resin composition capable of foaming is prepared by blending with the vinyl chloride resin the plasticizer, the foaming agent, the epoxy resin, and the hardener for the epoxy resin, and optionally the foaming control agent, the filler, the heat stabilizer, and the colouring agent and by mixing them to homogenize by means of a known kneader Examples of the fiber cloth of the present invention are woven cloth of organic or inorganic fiber, as well as net, nonwoven cloth, membrane and mat which are produced by bonding short fiber with binder. It is preferable that the fiber cloth is heat-resistant during the heating step for foaming and hardening the resin composition. If the heat resistance of the fiber cloth is low, deformation and/or shrinkage of the fiber cloth occurs, thereby making it difficult to obtain a flat surface of the resultant vehicle outer panel structure. Additionally, the thickness of the fiber cloth is preferably not more than 1 mm. If the thickness is more than 1 mm, the laminated sheet as a whole increases in weight and volume, thereby lowering operation efficiency. Examples of the fiber materials which are heat-resistant and suitable for the fiber cloth are cotton fiber, polyester fiber, nylon fiber, polyamide fiber, carbon fiber, glass fiber, metal fiber and the like. Of these fibers, the glass fiber is preferable from the view points of improving operation efficiency and performance.

The metallic film of the present invention is a sheet type base material for supporting the resin composition capable of foaming. The metallic film facilitates coating and carrying of the resin composition and sticking of the laminated sheet onto the vehicle outer panel, thus improving operation efficiency for the vehicle outer panel structure The metallic film is intended to provide surface strength and insulation to the laminated sheet whose resin composition is foamed, and therefore is preferably rigid and not expandable but flexible and light in weight. In this regard, metal foil having a thickness not more than $50\mu$ meets such characteristics and suitable for the metallic film. The metal foil is formed of aluminum, stainless steel, zinc, tin, nickel, copper, iron or the like. Of these materials, aluminum is excellent in extendibility and weight-lightening effect while providing economical advantages. In this connection, the thickness of the metallic film exceeding $50\mu$ contributes not only to increasing the weight of the laminated sheet but also to lowering the flexibility of the laminated sheet so that the laminated sheet cannot fit to a bent or curved panel while it difficult to obtain a foamed body having a uniform thickness.

As discussed above, it is essential that the laminated sheet according to the present invention comprises the first layer formed of the resin composition capable of foaming, the second layer of the fiber cloth, and the third layer of the metallic film. For comparison purpose, three cases in which do not fall within the scope of the present invention will be discussed hereinafter.

In a first case where the sheet attached to a vehicle outer panel is formed of only the first layer of the resin composition capable of foaming, the resultant vehicle outer panel structure is high in heat-insulation and reinforcement characteristics but low in strength. It will be understood that a sheet of the resin composition forming the first layer is directly attached to a metal panel and therefore must have a relatively high strength. However, it is difficult to obtain such a high strength sheet at a temperature below a foaming temperature of the resin composition. Further, when the sheet is attached on the vehicle outer panel, foreign matters and/or dirt tents to adhere to the sheet. Additionally, the surface of the sheet is exposed after being foamed, and therefore the resultant vehicle outer panel is unattractive.

In a second case where the sheet attached to a vehicle outer panel is formed of the laminated first layer of the resin composition and second layer of the fiber cloth, the sheet is improved in strength but has such a tendency that foreign matter and/or dirt is adhered thereto and a foamed body is exposed at joint during foarming, thereby making difficult to obtain the foamed body having a smooth surface.

In a third case where the sheet attached to a vehicle outer panel is formed of the laminated first layer of the resin composition and the third layer of the metallic film, the sheet is insufficient in strength owing to the fact that the metallic film is considerably thin, so that the sheet is liable to be broken under bending and pulling.

Referring to FIG. 1A in which a part of the metallic film is shown to be peeled off, the laminated sheet 2 of the present invention comprises the first layer 2A formed of the resin composition capable of foaming, the second layer 2B formed of the fiber cloth, and the third layer 2C formed of the metallic film. This laminated sheet can solve the problems in the above-discussed first, second and third cases and is improved in surface strength thereby providing the vehicle outer panel structure excellent with reinforcement.

Next, a method of producing the vehicle outer panel structure according to the present invention will be discussed. In the case where the resin composition capable of forming is liquid, the resin composition is directly coated on the surface of the fiber cloth previously laminated on the metallic film. The resin composition may be suitably fabricated and solidified upon being heated at a temperature below a level at which the foaming agent becomes effective to foam the resin composition Otherwise, the liquid resin composition may be continuously heated on a sheet (paper) for separating or on a steel belt in order to be fabricated into a sheet. The thus formed sheet will be laminated on the fiber cloth and the metallic film. The vinyl chloride resin of the paste type is advantageous for preparing the liquid resin composition and can readily solidify, thus absorbing the plasticizer and the epoxy resin upon heating. Additionally, by virtue of the liquid resin composition, the laminated sheet aan be obtained without using any adhesive.

The laminated sheet may be prepared by the following other methods: The mixed resin composition is fabricated into a sheet by using a known sheet forming machine such as a calender or an extrusion machine, and then laminated on the fiber cloth and the metallic film upon adhesion under pressure or using adhesive. Otherwise, the vinyl chloride resin and the epoxy resin are solved in a solvent and coated onto the fiber cloth and the metallic film after being mixed with other blending materials. Then, the solvent is evaporated to form the coated mixture into a sheet. These methods are advantageous in case the mixture of the resin composition is solid.

As shown in FIG. 1A, the laminated sheet 2 is fabricated in such a manner that the fiber cloth 2B is interposed between the resin composition 2A and the metallic film 2C. The method of fabricating the laminated sheet is not limited to a particular one. However, it is preferable that the resin composition capable of foaming is directly coated onto the fiber cloth laminated on the metallic film and heated to solidify at the temperature below the level for making the foaming agent effective for foaming the resin composition. The thus fabricated laminated sheet is high in flexibility and ready for rolling-up, cutting and carrying.

Subsequently, a method of attaching the laminated sheet on the back or inner side surface of the vehicle outer panel will be discussed hereinafter. The face of the resin composition capable of foaming of the laminated sheet exhibits a self-adhesion, and therefore the laminated sheet can be readily stuck onto the vehicle outer panel upon being pressed on the vehicle outer panel without carrying out any adhesion treatment or using any adhesive. This is considered to depend on the fact that although the epoxy resin is absorbed in the vinyl chloride resin during sheet fabrication, the excessive epoxy resin which is not absorbed in the vinyl chloride resin remain in the laminated sheet thereby exhibiting adhesion. Such phenomena was not anticipated at the beginning but was found accidentally in the process of seeking condition of sheet fabrication of the laminated sheet, thereby making the present invention practically excellent and epoch-making. It will be understood that it is possible to add a tackifier other than the epoxy resin into the blended resin composition in order to increase adhesion of the resin composition. Otherwise, it is also possible to apply adhesive onto the surface of the laminated sheet or onto the vehicle outer panel. In any event, according to the method of the present invention, the thin and flexible laminated sheet can be attached very readily to the vehicle outer panel by merely being pressed onto the vehicle outer panel while making possible to be uniformly stuck so as to fit to the shape of the vehicle outer panel, as compared with a conventional method in which a heat-insulation material such as a foamed material or felt is stuck to a vehicle outer panel by using adhesive. Additionally, since the surface of the laminated sheet is covered with the metallic film, dirt tends to adhere thereto improving appearance of the laminated sheet.

Next, a method for foaming and hardening the resin composition of the laminated sheet will be discussed hereinafter. The resin composition of the laminated sheet stuck to the vehicle outer panel is passed through a heating furnace to be foamed and hardened, thus providing the vehicle outer panel structure with improved in heat-insulation and mechanical strength. The mechanism of the foaming and hardening of the resin composition including the epoxy resin is considered as follows: First, the vinyl chloride resin melts upon heating. Then, the foaming agent decomposes to generate gas. The thus generated gas foams the resin composition to form cells in the resin composition. Subsequently, the epoxy resin contained and dispersed in the resin composition makes its hardening reaction under the activation of the hardener, so that the resin composition hardens Accordingly, the characteristics of the thus formed foamed body depends on the gellation rate of the vinyl chloride resin, the decomposition rate of the foaming agent and the hardening rate of the epoxy resin. The materials blended as the resin composition are selected depending upon a target foaming density and a hardening degree.

For heating the laminated sheet after attachment to the vehicle body panel, a usual heating furnace for baking of paint is suitable to be used. Coating or painting furnaces are generally classified into under coating furnaces, intermediate coating furnaces and final coating furnaces, of which intermediate coating furnace or the final coating furnace is preferable as the heating furnace used in the vehicle outer panel structure producing method in accordance with the present invention.

Figure 1B:
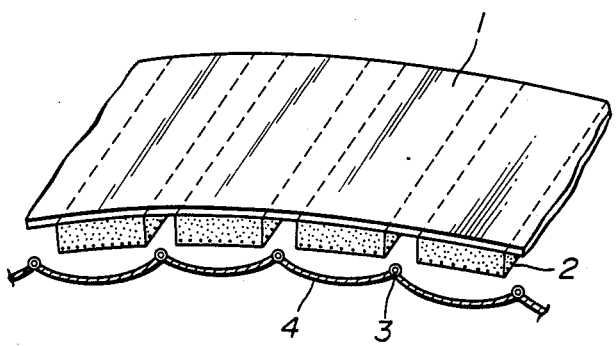
FIG. 1B is a fragmentary perspective view of an embodiment of the vehicle outer panel (roof) structure in accordance with the present invention.

FIG. 1B shows an example of the vehicle outer panel (roof) structure of the present invention, which is produced by the above-discussed production methods and used in combination with a pending ceiling structure of an automotive vehicle similar to that of FIGS. 2 and 3. In the example of FIG. 1B, the laminated sheet 2 constructed of first layer of the resin composition, second layer of the fiber cloth and third layer of the metallic film is securely attached to the back side of the vehicle roof panel 1, in which the resin composition is directly stuck to the vehicle roof panel. Additionally, in this example, listing wires 3 are extended below the attached laminated sheet. A head lining 4 is secured to the listing wires 3 thereby to form the pending ceiling structure.

Performances of the vehicle outer panel structure according to the present invention will be evaluated with reference to Examples an Comparative Examples and by testing methods for measuring the physical properties of the vehicle outer panel structures.

EXAMPLES 1 to 5 and COMPARATIVE EXAMPLES 1 to 3

A resin composition capable of foaming was prepared by mixing components in a blending ratio shown in Table 1A for 20 minutes by using a mixer. The resin composition was coated in a thickness of about 1 mm on the surface of the glass cloth of a laminated aluminum-cloth which had prepared by laminating the glass cloth on an aluminum foil having a thickness of 20μ, and then heated at 150° C. for 2 minutes in a hot air heating furnace thereby to obtain a foamed body of the resin composition. For this foamed body, expansion ratio, heat insulation characteristics, hardness, reinforcement characteristics and appearance were measured according to testing methods as discussed below. Additionally, adhesion characteristics for the resin composition which had not yet foamed was measured also according to the testing methods. The test results or measured values are shown in Table 1B.

As demonstrated in Tables 1A and 1B, in the case where the epoxy resin is contained in an amount less than 20 parts by weight relative to 100 parts by weight of the vinyl, chloride resin, the adhesion of the laminated sheet containing the resin composition (not yet foamed) is insufficient while minimizing reinforcement effect. In case the epoxy resin is contained in an amount above 500 parts by weight, bleed of the epoxy resin occurs thereby making adhesion insufficient while hardening heat generation is greater thereby causing the foamed body to thermally decompose.

EXAMPLES 6 AND 7 AND COMPARATIVE EXAMPLES 4 TO 7

A resin composition capable of foaming was prepared by mixing the components in a blending ratio of Example 3 shown in Table 1A by using a mixer. The resin composition was coated in a thickness of 0.8 mm on the laminated second and third layers as shown in Table 2 so that the resin composition was formed as the first layer, in which the second layer was put between the first and third layers. The thus formed three-layer sheet was heated at 160° C. for 1 minute in a hot air oven thereby to obtain a laminated sheet capable of foaming. With respect to Comparative Examples 4 and 6 in which there is no third layer, the resin composition was coated directly on the surface of a sheet (paper) for separating or on the second layer laminated on the sheet for separating, and heated in the same condition as mentioned above to obtain a laminated sheet capable of foaming.

The thus obtained laminated sheet was stuck to the surface of an iron plate and heated at 160° C. for 30 minutes and subjected to tests according to the testing methods discussed below so as to measure expansion atio, hardness, reinforcement characteristics and appearance. Additionally, operation efficiency was also evaluated for the laminated seeet. The test results or measured values are shown in Table 2.

As demonstrated in Table 2, the laminated sheets of Examples of the present invention are excellent in operation efficiency, appearance, the characteristics of the foamed body and further improved in rigidity. In contrast, the laminated sheets of Comparative Examples outside the scope of the present invention are inferior in operation efficiency and difficult to obtain smooth surface of the foamed body.

TESTING METHODS (a) Adhesion characteristics

The resin composition capable of foaming is coated in a thickness of 1 mm on the aluminum-cloth and then fabricated at a predetermined temperature to obtain a test sheet capable of foaming. The thus formed two test sheets are adhered to each other in an area of 2 cm×2 cm and subjected to a test for measuring adhesion strength (tensile and shearing strength). The thus measured adhesion strength is an index for adhesion.

(b) Expansion ratio

The thickness of the resin composition capable of foaming of the laminated sheet is measured as "a(mm)". Subsequently, the laminated sheet is stuck on the surface of a panel and heated at 150°–160° C. for 30 minutes in a hot air heating furnace. At this time, the thickness of the resin composition in the heated laminated sheet is measured as "b(mm)". The expansion ratio is obtained by an formula of b/a.

(c) Heat insulation characteristics

Coefficient of thermal conductivity of the foamed body or the foamed resin composition is measured by a thermal conductivity coefficient meter (of HC-071 H type and produced by Eikoh Seiki Co.). The coefficient of thermal conductivity is an index of heat insulation characteristics.

(d) Hardness

Hardness of the foamed body or the foamed resin composition is measured by a rubber tester C (produced by Kohbunshi Keiki Co.).

(e) Reinforcement characteristics

The laminated sheet having a thickness of 1 mm is stuck on a steel plate having a thickness of 0.8 mm, and heated at 150°–160° C. for 30 minutes in a hot air heating furnace so that the resin composition is foamed, thereby obtaining a test piece. Flexural strength of the test piece is measured by a flexural strength measuring device according to JIS (Japanese Industrial Standard) K-6911 in which the distance between support points is 100 mm; and load rate is 5 mm/min. In this measurement, a load ($y_1$) at a time of displacement (deformation) of 2 mm is obtained. A load ($y_2$) at a time of displacement of 2 mm of only the steel plate is separately measured. Flexural rigidity ratio is obtained by a formula of $y_1/y_2$ and is an index of the reinforcement characteristics.

(f) Appearance

Smoothness and foaming state of the foamed resin composition are judged by visual observation.

TABLE 1A

| Component | Comparative example 1 | Example 1 | Example 2 | Example 3 | Example 4 | Example 5 | Comparative example 2 | Comparative example 3 |
|---|---|---|---|---|---|---|---|---|
| Nipeon A-47 (vinyl chloride resin paste) | 100 | 100 | 100 | 100 | 100 | 100 | 100 | 100 |
| Dioctylphthalate (plasticizer)[b] | 40 | 40 | 40 | 40 | 40 | 40 | 40 | 40 |
| Epikote No. 828 (liquid epoxy resin)[c] | 10 | 20 | 50 | 100 | 200 | 400 | 600 | 0 |
| Dicyandiamide (hardener for epoxy resin)[d] | 0.5 | 1.0 | 2.5 | 5.0 | 10.0 | 20.0 | 30.0 | 0 |
| D.P hardener (hardening acceleator for epoxy resin)[e] | 0.3 | 0.6 | 1.5 | 3.0 | 6.0 | 12.0 | 18.0 | 0 |
| AZ-M1 (foaming agent)[f] | 4.3 | 4.6 | 5.5 | 7 | 10 | 16 | 22 | 4.0 |
| Whiton H (filler)[g] | 18 | 20 | 23 | 30 | 43 | 70 | 95 | 17 |
| BAP-1 (cell control agent)[h] | 1.2 | 1.3 | 1.6 | 2 | 2.9 | 4.6 | 6.4 | 1.1 |
| FL-23 (heat stabilizer)[i] | 1.8 | 2 | 2.3 | 3 | 4.3 | 7.0 | 9.5 | 1.7 |

Note:
[a] produced by Nippon Zeon Co., Ltd.
[b] produced by Sanken Kakoh Co., Ltd.
[c] produced by Yuka Shell Epoxy Kabushiki Kaisha
[d] produced by Nippon Carbide Industries Co., Ltd.
[e] produced by Maruwa Biochemical Co., Ltd.
[f] produced by Otsuka Chemical Co., Ltd.
[g] produced by Shiraishi Industrial Co., Ltd.
[h] produced by Adeka Argus Chemical Co., Ltd.
[i] produced by Adeka Argus Chemical Co., Ltd.

TABLE 1B

| Item | Comparative example 1 | Example 1 | Example 2 | Example 3 | Example 4 | Example 5 | Comparative example 2 | Comparative example 3 |
|---|---|---|---|---|---|---|---|---|
| Adhesion characteristics (kg/cm$^2$) | 0.1 | 0.2 | 0.3 | 0.4 | 0.5 | 0.3 | 0.1 | 0 |
| Expansion ratio (times) | 6.3 | 6.6 | 6.9 | 6.9 | 6.7 | 6.9 | 2.0 or less | 3.0 or less |
| Coefficient of thermal conductivity (kcal/m.Hr. °C.) | 0.036 | 0.038 | 0.036 | 0.035 | 0.036 | 0.035 | — | — |
| Hardness | 25 | 58 | 63 | 70 | 81 | 92 | 90 or more | — |
| Flexural rigidity ratio ($y_1/y_0$) | 1.10 | 1.30 | 1.40 | 1.62 | 2.41 | 2.75 | — | — |
| Appearance | good | good | good | good | slightly color-changed | slightly color-canged | blackened and decomposed | permanently fatigued |

TABLE 2

| Item | Comparative example 4 | Comparative example 5 | Comparative example 6 | Comparative example 7 | Example 6 | Example 7 |
|---|---|---|---|---|---|---|
| Laminated sheet | | | | | | |
| 1st layer | Resin composition capable of foaming | Resin composition capable of foaming | Resin composition capable of foaming | Resin composition capable of foaming | Resin composition capable of foaming | Resin composition capable of foaming |
| 2nd layer | None | None | Glass fiber mat | Glass fiber cloth | Glass fiber cloth | Glass fiber mat |
| 3rd layer | None | 20μ thickness Al foil | None | 60μ thickness Al sheet | 20μ thickness Al foil | 30μ thickness stainless steel sheet |
| Operation efficiency | Sheet dirtied | Al foil much cracked | Punctured by glass fiber | Could not stuck flatly | Good | Good |
| Expansion ratio | 6.8 | 6.9 | 6.8 | 7.0 | 7.2 | 7.0 |
| Hardness | 67 | 66 | 67 | 80 | 73 | 80 |
| Flexural rigidity ratio | 1.35 | 1.55 | 1.38 | 1.60 | 2.03 | 2.21 |
| Appearance | Good (partly | Many creases | Much unevenness | Partly peeled | Good | Good |

TABLE 2-continued

| Item | Comparative example | | | | Example | |
|---|---|---|---|---|---|---|
| | 4 | 5 | 6 | 7 | 6 | 7 |
| | dirtied) | formed | formed | off | | |

EXAMPLE 8

Figure 5:
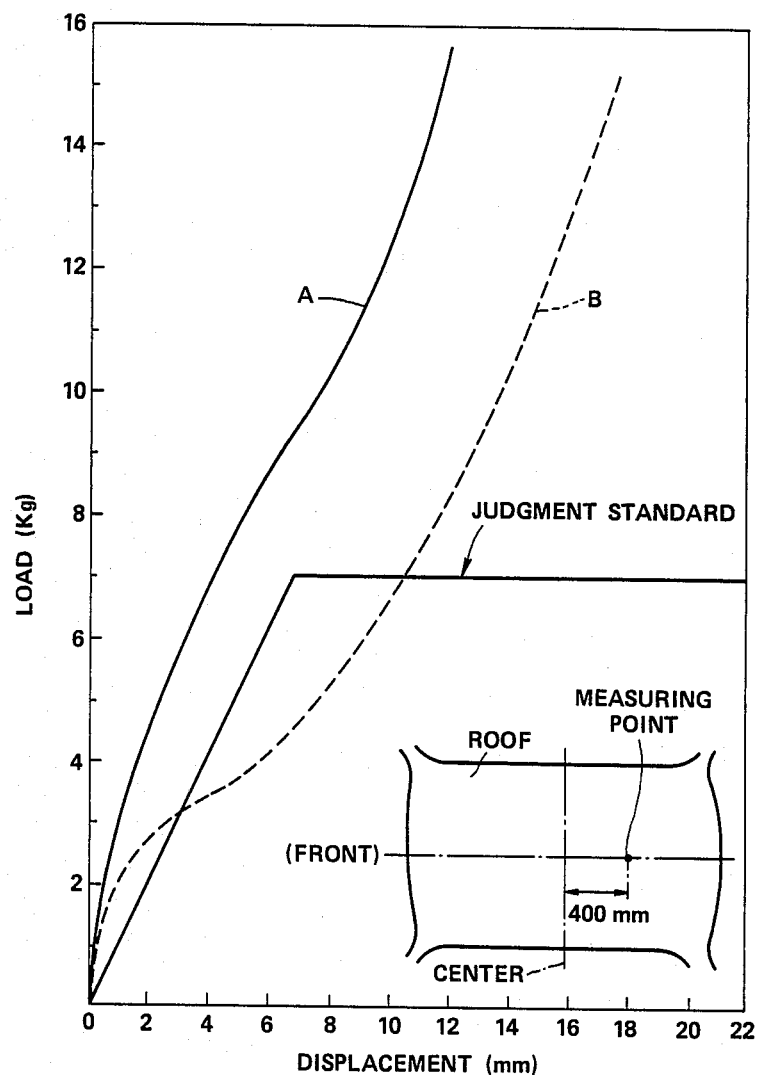
FIG. 5 is a graph showing the relationship between load and displacement of the vehicle outer pnnel (roof) structure according to the present invention in comparison with that of a conventional vehicle outer panel (roof) structure.

The laminated sheet produced in the Example 8 was cut in a dimension of 400 mm width and 1000 mm length and stuck to the inner surface of a vehicle roof panel. The roof panel with the laminated sheet was heated for 30 minutes in a painting-baking oven whose set temperature condition was 160° C., thus obtaining a vehicle outer (roof) panel structure having heat-insulation and reinforcement effects as shown in FIG. 1B and like that of FIG. 3. The thus formed vehicle roof panel structure had a thickness of about 6 mm after the resin composition was hardened. The vehicle roof panel structure was subjected to test in order to seek relationship between load applied add displacement (deformation) as shown in FIG. 5. The test was so conducted that load was applied to a measuring point of the vehicle roof panel structure which point was located 400 mm behind the center of the roof. In FIG. 5, a curve A indicates data of the vehicle outer panel structure according to the present invention, whereas a curve B indicates data of the conventional vehicle outer panel structure as shown in FIG. 2. It is to be noted that results located in the upper side of the line of a judgment standard in FIG. 5 are accepted, whereas results located in the lower side of the judgment standard line are rejected. FIG. 5 demonstrates a greater reinforcement effect of the outer panel structure of the present invention to the roof panel as compared with the conventional outer panel structure. Additionally, the coefficient of thermal conductivity of the vehicle outer panel structure formed in Example 8 was measured as 0.036 kcal/m.Hr.°C.

As illustrated in Examples 1 to 8, according to the present invention, vehicle outer panel structures are largely improved in heat-insulation effect and reinforcement effect, thereby improving value and quality of merchandise. Additionally, the vehicle outer panel structure of the present invention is easily installed thereby significantly saving labor in the assembly operation of vehicles.

As discussed above, the present invention can provide a vehicle outer panel structure which is excellent in heat-insulation and reinforcement effects and operation efficiency. The vehicle outer panel structure of the present invention is comprised of the laminated sheet having one side formed of the thin resin composition capable of foaming and having self-adherence, and another side formed of the metallic film. Accordingly, the laminated sheet can be readily attached to the vehicle outer panel in an automotive vehicle assembly process. In this connection, it is conventional that a reinforcement material for an outer panel and a heat-insulation material to have been attached to the outer panel with adhesive and under man power, and therefore the number and/or effort of workers unavoidably increases. In contrast, readiness in attaching of the laminated sheet of the present invention reduces man power required in assembly of vehicles. Additionally, the laminated sheet of the present invention serves as both a heat-insulation material and a reinforcement material, thereby contributing to saving resources and energy.

Concerning the foamed resin composition or foamed body, it is in close relation to the reinforcement characteristics of the resin composition to the outer panel, in which as the hardson increases, the foamed body contains more gas such as air to minimize the coefficient of thermal conductivity, thus improving the heat-insulation effect. In this regard, tests were conducted to measure as an index of heat-insulation the coefficient of thermal conductivity of the foamed body of the resin composition (including the vinyl chloride resin) of the present invention in comparison with a conventional heat-insulation material. The data obtained in the tests is shown in Table 3. As seen from Table 3, the foamed body having an expansion ratio lower than 4 exceeds the level of the thermal conductivity coefficient of the conventional heat-insulation material.

Concerning hardness of the foamed resin composition or foamed body, it is in close relation to the reinforcement characteristics of the resin composition to the outer panel, in which as the hardness increases, the elastic modulus of the foamed body increases thereby to increase the reinforcement characteristics of the outer panel structure thus largely reinforcing particularly the stretching rigidity of a vehicle roof panel. This effect is remarkable particularly in a case where a rigid film is provided at a surface, as in the laminated sheet of the present invention. In this regard, tests were conducted to measure the hardness of the foamed bodies of the present invention and the flexural rigidity ratio as an index of the reinfocement characteristics of the panel structures of the present invention, in which the expansion ratio of the foamed body was 5 (times). The results of the tests are shown in Table 4. Table 4 depicts the fact that the foamed body having a hardness not lower than 40 gives the flexural rigidity ratio ($E_1I_1/E_0I_0$) not less than 1.2, which demonstrates that the foamed body of the present invention provides an excellent reinforcement effect to the vehicle outer panel.

TABLE 3

| Material | Expansion ratio | Coefficient of thermal conductivity (kcal/m.hr. °C.) |
|---|---|---|
| Foamed resin composition including vinyl chloride resin | 2 | 0.052 |
| | 3 | 0.044 |
| | 4 | 0.039 |
| | 5 | 0.037 |
| Conventional[1] heat-insulation material | — | 0.041 |

Note:
[1]Feltop (felt) produced by Howa Textile Industry Co., Ltd.

TABLE 4

| Hardness of [2] foamed body | Flexural rigidity [3] ratio ($E_1I_1E_0I_0$) |
|---|---|
| 11 | 1.00 |
| 23 | 1.05 |
| 39 | 1.25 |
| 54 | 1.45 |
| 71 | 2.01 |

TABLE 4-continued

| Hardness of [2] foamed body | Flexural rigidity [3] ratio ($E_1I_1E_0I_0$) |
|---|---|
| 87 | 2.53 |

Note:
[2] Rubber Tester (produced by Kohbunshi Keiki Co.)
[3] $E_0I_0$: the flexural rigidity of 0.8 mm thickness steel plate
$E_1I_1$: the flexural rigidity of a panel structure prepared by sticking the laminated sheet (5 mm thickness) of the present invention to a steel plate (0.8 mm thickness)

What is claimed is:

1. A vehicle outer panel structure comprising:
a vehicle outer panel;
a laminated sheet attached to said vehicle outer panel, said laminated sheet including a first layer formed of a foamed resin composition containing vinyl chloride resin and epoxy resin, said first layer being stuck onto back side of said vehicle outer panel, a second layer formed of fiber cloth, and a third layer formed of metallic film having a thickness not more than 50μ, said first, second and third layers being stuck with each other so that said second layer being interposed between said first and third layers.

2. A method of producing a vehicle outer panel structure, comprising the following steps in the sequence set forth:
laminating first, second and third layers to form a laminated sheet, said first layer being formed of a resin composition capable of foaming and including vinyl chloride resin, plasticizer, foaming agent, epoxy resin, hardener for said epoxy resin, content of said epoxy resin being within a range of from 20 to 500 parts by weight relative to 100 parts by weight of said vinyl chloride resin, said second layer being formed of fiber cloth, said third layer being formed of metallic film having a thickness not more than 50μ, said first, second and third layers being stuck with each other so that said second layer is interposed between said first and third layers;
sticking said first layer to back side of a vehicle outer panel to attach said laminated sheet to said vehicle outer panel; and
heating said laminated sheet to foam and harden said resrn composition of said laminatd sheet.

3. A method as claimed in claim 2, further comprising the step of heating said first layer at a temperature below a level at which said foaming agent is activated to generate gas, before the step of laminating said first, second and third layers.

4. A method as claimed in claim 1, wherein the step of heating said laminated sheet is carried out at a temperature ranging foom 120° to 200° C.

5. A method as claimed in claim 1, wherein said vinyl chloride resin includes at least one of homopolymer and copolymer of vinyl chloride.

6. A method as claimed in claim 5, wherein said copolymer is of vinyl chloride and at least one selected from the group consisting of vinyl acetate, acrylic acid, methacrylic acid, acrylic ester, methacrylic ester, maleic acid, fumaric acid, maleic acid ester, fumaric acid ester, itaconic acid, vinylidene chloride, and vinyl ether.

7. A method as claimed in claim 1, wherein said plasticizer includes at least one selected from the group consisting of dioctyl phthalate, dibutyl phthalate, tricresyl phosphate, dioctyl adipate, dioctyl sebacate, condensation product between adipic acid and ethylene glycol, trioctyl trimellitate, chlorinated paraffin, alkylbenzene, and high molecular weight aromatic compound.

8. A method as claimed in claim 1, wherein content of said plasticizer is within a range of from 10 to 150 parts by weight relative to 100 parts by weight of said vinyl chloride resin.

9. A method as claimed in claim 1, wherein said foaming agent includes at least one selected from the group consisting of organic foaming agent, inorganic foaming agent and microcapsule type foaming agent.

10. A method as claimed in claim 9, wherein said organic foaming agent includes at least one selected from the group consisting of azodicarbonamide, paratoluene sulfonyl hydrazide, dinitroso pentamethylene tetramine and 4,4'-oxybisbenzene sulfonyl hydrazide.

11. A method as claimed in claim 9, wherein said inorganic foaming agent includes at least one selected from the group consisting of sodium hydrogencarbonate and sodium boron hydride.

12. A method as claimed in claim 9, wherein said microcapsule type foaming agent includes low boiling point hydrocarbon covered with polyvinylidene chloride.

13. A method as claimed in claim 10, wherein said organic foaming agent decomposes at a temperature not higher than 100° C.

14. A method as claimed in claim 1, wherein content of said foaming agent is within a range of from 0.5 to 15 parts by weight relative to 100 parts by weight of said vinyl chloride resin.

15. A method as claimed in claim 1, wherein said epoxy resin includes at least one of epoxy resin of the type selected from the group consisting of glycidyl ether type, glycidyl ester type, glycidyl amine type, linear aliphatic epoxide type, and aliphatic epoxide type.

16. A method as claimed in claim 1, wherein content of said epoxy resin is within a range of from 20 to 500 parts by weight relative to 100 parts by weight of said vinyl chloride resin.

17. A method as claimed in claim 1, wherein said hardener is of the type of being activated to harden said epoxy resin upon heating.

18. A method as claimed in claim 17, wherein said hardener is activated at a temperature between 100° to 200° C.

19. A method as claimed in claim 1, wherein said hardener includes at least one selected from the group consisting of dicyandiamide, 4,4'-diaminodipheyyl sulfone, 2-n-heptadecyl imidazole, isophthalic acid dihydrazide, N,N-dialkyl urea derivative, N,N-dialkyl thiourea derivative, tetrahydrophthalic anhydride, isophorone diamine, methaphenylene diamine, N-aminoethyl piperazine, boron trifluoride complex compound, and trisdimethyl amino methyl phenol.

20. A method as claimed in claim 1, wherein content of said hardener is within a range of from 1 to 20 parts by weight relative to 100 parts by weight of said epoxy resin.

21. A method as claimed in claim 1, wherein said fiber cloth is formed of fiber and of the type of one selected from the group consisting of woven cloth, net, nonwoven cloth, membrane, and mat.

22. A method as claimed in claim 21, wherein said fiber includes at least one of cotton fiber, polyester fiber, nylon fiber, polyamide fiber, carbon fiber, glass fiber, and metal fiber.

23. A method as claimed in claim 1, wherein said fiber cloth has a thickness not more than 1 mm.

24. A method as claimed in claim 1, wherein said metallic film is made of a metal selected from the group consisting of aluminum, stainless steel, zinc, tin, nickel copper, and iron.

25. A metnod as claimed in claim 1, wherein the step of heating said laminated sheet includes expanding said resin composition so that thickness of the said composition increases four times or more that before heating.

* * * * *